United States Patent
Yuan

(10) Patent No.: US 12,352,523 B1
(45) Date of Patent: Jul. 8, 2025

(54) INSECTICIDAL GUN SWITCHABLE BETWEEN SINGLE FIRING MODE AND CONTINUOUS FIRING MODE

(71) Applicant: S-BEAM PRECISION PRODUCTS LIMITED, Zhongshan (CN)

(72) Inventor: Dingxiang Yuan, Zhongshan (CN)

(73) Assignee: S-BEAM PRECISION PRODUCTS LIMITED, Zhongshan (CN)

( * ) Notice: Subject to any disclaimer, the term of this patent is extended or adjusted under 35 U.S.C. 154(b) by 0 days.

(21) Appl. No.: 18/650,339

(22) Filed: Apr. 30, 2024

(30) Foreign Application Priority Data

Mar. 22, 2024 (CN) .......................... 202420576142.1

(51) Int. Cl.
| | |
|---|---|
| *F41B 11/57* | (2013.01) |
| *A01M 1/20* | (2006.01) |
| *A01M 7/00* | (2006.01) |
| *F41B 11/52* | (2013.01) |
| *F41B 11/64* | (2013.01) |
| *F41B 11/71* | (2013.01) |
| *F41B 11/80* | (2013.01) |

(52) U.S. Cl.
CPC ............... *F41B 11/64* (2013.01); *A01M 1/20* (2013.01); *A01M 7/0046* (2013.01); *F41B 11/52* (2013.01); *F41B 11/57* (2013.01); *F41B 11/71* (2013.01); *F41B 11/80* (2013.01)

(58) Field of Classification Search
CPC ........... F41B 11/52; F41B 11/64; F41B 11/71; F41B 11/80; F41B 11/81; F41B 11/721; F41B 11/722; F41B 11/57
See application file for complete search history.

(56) References Cited

U.S. PATENT DOCUMENTS

2009/0145412 A1 * 6/2009 Barish ..................... F41B 11/89
124/1
2010/0326414 A1 * 12/2010 Maeda ..................... F41B 11/52
124/74

FOREIGN PATENT DOCUMENTS

EP          2267396 A1 * 12/2010 ............. F41B 11/51

* cited by examiner

*Primary Examiner* — Jonathan C Weber
(74) *Attorney, Agent, or Firm* — MATTHIAS SCHOLL P.C.; Matthias Scholl

(57) ABSTRACT

An insecticidal gun including a gun body, a feeding member, a percussion member, a trigger, and an electric drive mechanism. The gun body includes a launching chamber; the feeding member is slidably connected to the gun body and includes a material storage chamber configured to communicate with the launching chamber. The electric drive mechanism is configured to drive the percussion member to move in the launching chamber. When the percussion member is driven by the electric drive mechanism to move, the feeding member moves along the axial direction of the gun body, so that the material storage chamber communicates with the launching chamber intermittently. The trigger is rotatable with respect to the gun body to activate or inactivate the electric drive mechanism.

9 Claims, 7 Drawing Sheets

INSECTICIDAL GUN SWITCHABLE BETWEEN SINGLE FIRING MODE AND CONTINUOUS FIRING MODE

CROSS-REFERENCE TO RELATED APPLICATIONS

Pursuant to 35 U.S.C. § 119 and the Paris Convention Treaty, this application claims foreign priority to Chinese Patent Application No. 202420576142.1 filed Mar. 22, 2024, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to an insecticidal gun that is switchable between a single firing mode and a continuous firing mode.

An insecticidal gun is a device that sprays deinsectization agents (pellets or insecticides) to kill insects. Traditional insecticidal guns include a gun body with a launching chamber and a material storage chamber connected to the launching chamber on the gun body. The material storage chamber provides insecticides to the launching chamber, and the insecticides in the launching chamber are driven and ejected by compressed air to achieve the goal of killing insects. Due to the fact that traditional insecticidal guns are driven to fire by compressed air, continuous compression of the trigger is required, making them inconvenient to operate. Additionally, due to the limitations of the compression device, continuous firing cannot be achieved, resulting in low insecticidal efficiency.

SUMMARY

The disclosure provides an insecticidal gun that is switchable between a single firing mode and a continuous firing mode, comprising a gun body, a feeding member, a percussion member, a trigger, and an electric drive mechanism. The gun body comprises a launching chamber; the feeding member is slidably connected to the gun body and comprises a material storage chamber configured to communicate with the launching chamber; the electric drive mechanism is configured to drive the percussion member to move in the launching chamber; when the percussion member is driven by the electric drive mechanism to move, the feeding member moves along an axial direction of the gun body, so that the material storage chamber communicates with the launching chamber intermittently; and the trigger is rotatable with respect to the gun body to activate or inactivate the electric drive mechanism.

In a class of this embodiment, the percussion member comprises a rack extending along the axial direction of the gun body; the electric drive mechanism comprises a motor disposed on the gun body and a gear set driven by the motor; and the gear set comprises a driving gear meshed with the rack.

In a class of this embodiment, the driving gear comprises a cam; the feeding member comprises a connecting rod extending to one side of the cam; when in use, the electric drive mechanism drives the percussion member to move, the cam leans against the connection rod to drive the feeding member on the gun body, and the material storage chamber communicates with the launching chamber; the insecticidal gun further comprises an elastic member disposed on one side of the feeding member and sleeving the gun body; when the cam is separated from the connection rod, the elastic member drives the feeding member to move, and the material storage chamber is disconnected with the launching chamber.

In a class of this embodiment, the feeding member comprises a storage member sleeving the gun body; the storage member comprises an accommodation space and the elastic member is disposed in the accommodation space.

In a class of this embodiment, a cross-section of the material storage chamber gradually increases in a direction away from the gun body.

In a class of this embodiment, the gun body further a guide groove, and the connecting rod is slidable in the guide groove.

In a class of this embodiment, the gun body comprises a switch electrically connected to the electric drive mechanism on one side of the trigger; when rotating relative to the gun body, the trigger presses or releases the switch to open or close the electric drive mechanism.

In a class of this embodiment, the driving gear comprises a stop part; the trigger comprises a switching member disposed on one side of the stop part; the switching member is movable along the axial direction of the gun body to change between a single firing position and a continuous firing position; the trigger further comprises a firing seat configured to pushing against or detach from the switch; when the switching member is in a single firing position, the stop part abuts against the switching member and the firing seat detaches from the switch; the switching member comprises an active part abutting against the stop part; when moving to a continuous firing position, the switching member pushes the active part to move and release the stop part.

In a class of this embodiment, the percussion member comprises one end extending into the launching chamber, and a seal ring is disposed on an outer wall of the end.

The following advantages are associated with the insecticidal gun of the disclosure. The electric drive mechanism is disposed on the gun body to drive the percussion member to move along the launching chamber to achieve the ejection of insecticides. As the percussion member is driven to move by the electric drive mechanism, there is no need for compressed air. Thus, the operation is simple, and continuous firing can be achieved, leading to high insecticidal efficiency. Furthermore, when the electric drive mechanism drives the percussion member to move, the material storage chamber is intermittently connected to the launching chamber, which can not only meet the supply of insecticides for the launching chamber, but also avoid the possible blockage or waste caused by the continuous supplementation of insecticides for the launching chamber.

DETAILED DESCRIPTION

To further illustrate the disclosure, embodiments detailing an insecticidal gun are described below. It should be noted that the following embodiments are intended to describe and not to limit the disclosure.

Figure 1:
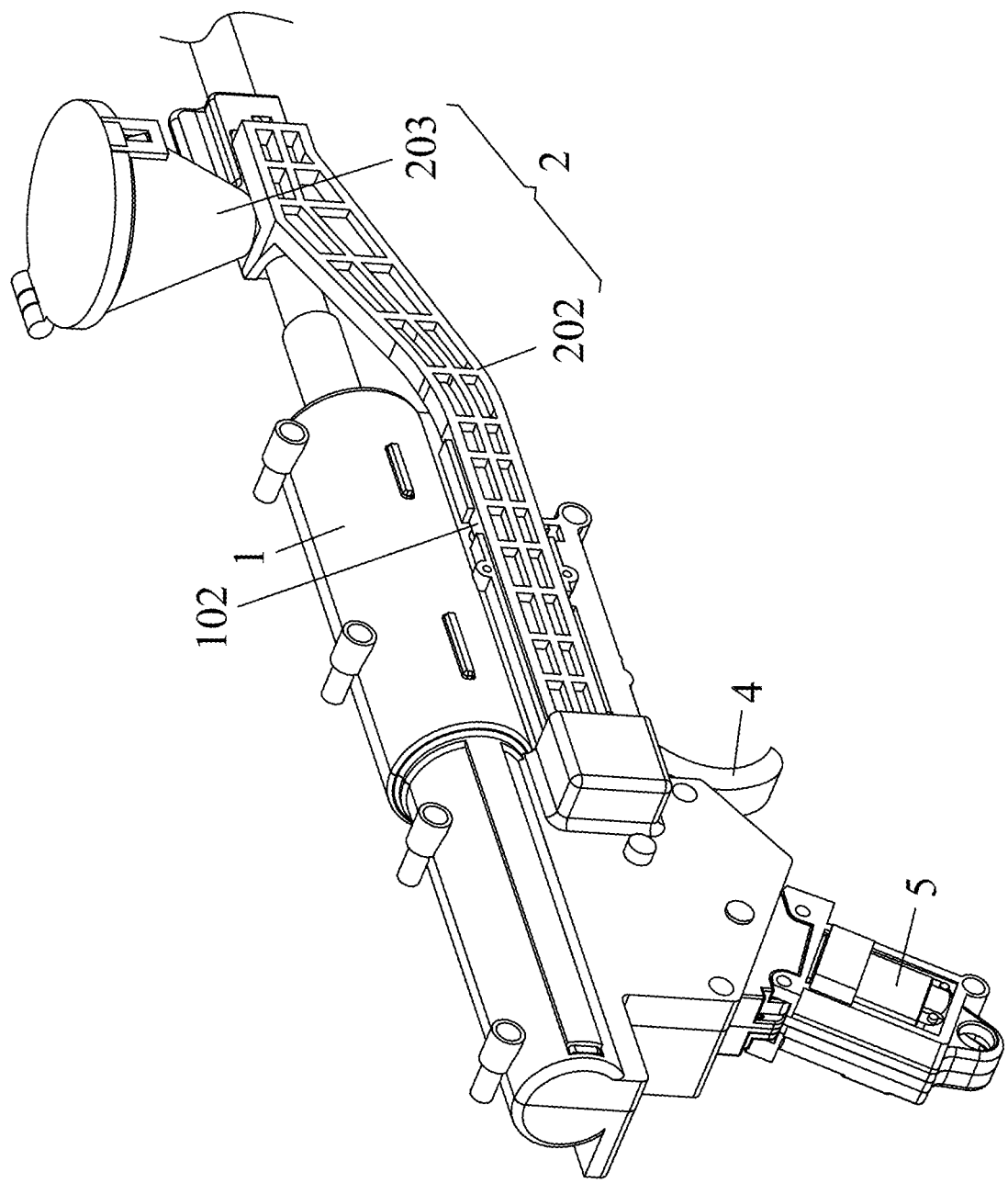
FIG. 1 is a first schematic diagram of an insecticidal gun in accordance with one embodiment of the disclosure.
Figure 2:
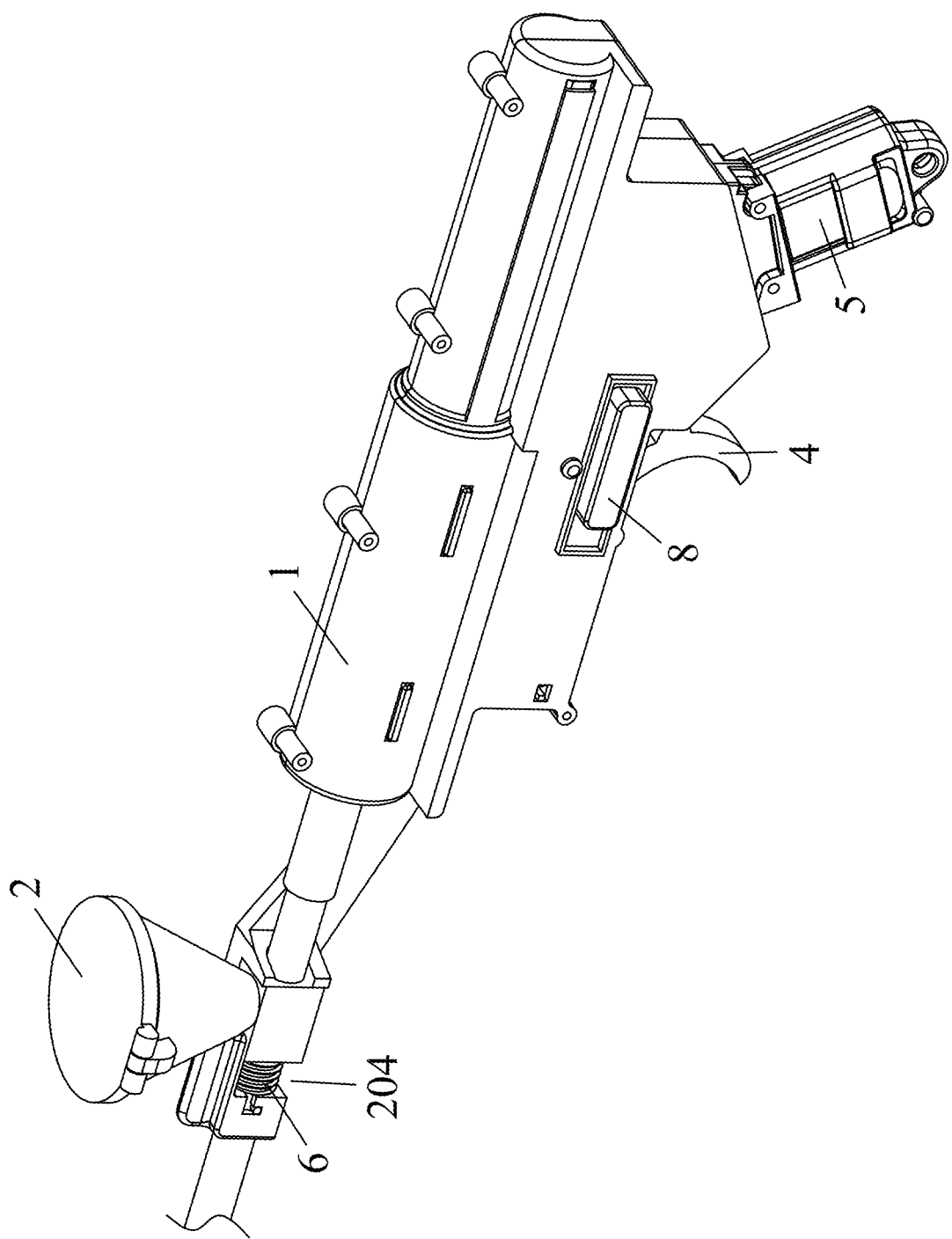
FIG. 2 is a second schematic diagram of an insecticidal gun in accordance with one embodiment of the disclosure.
Figure 3:
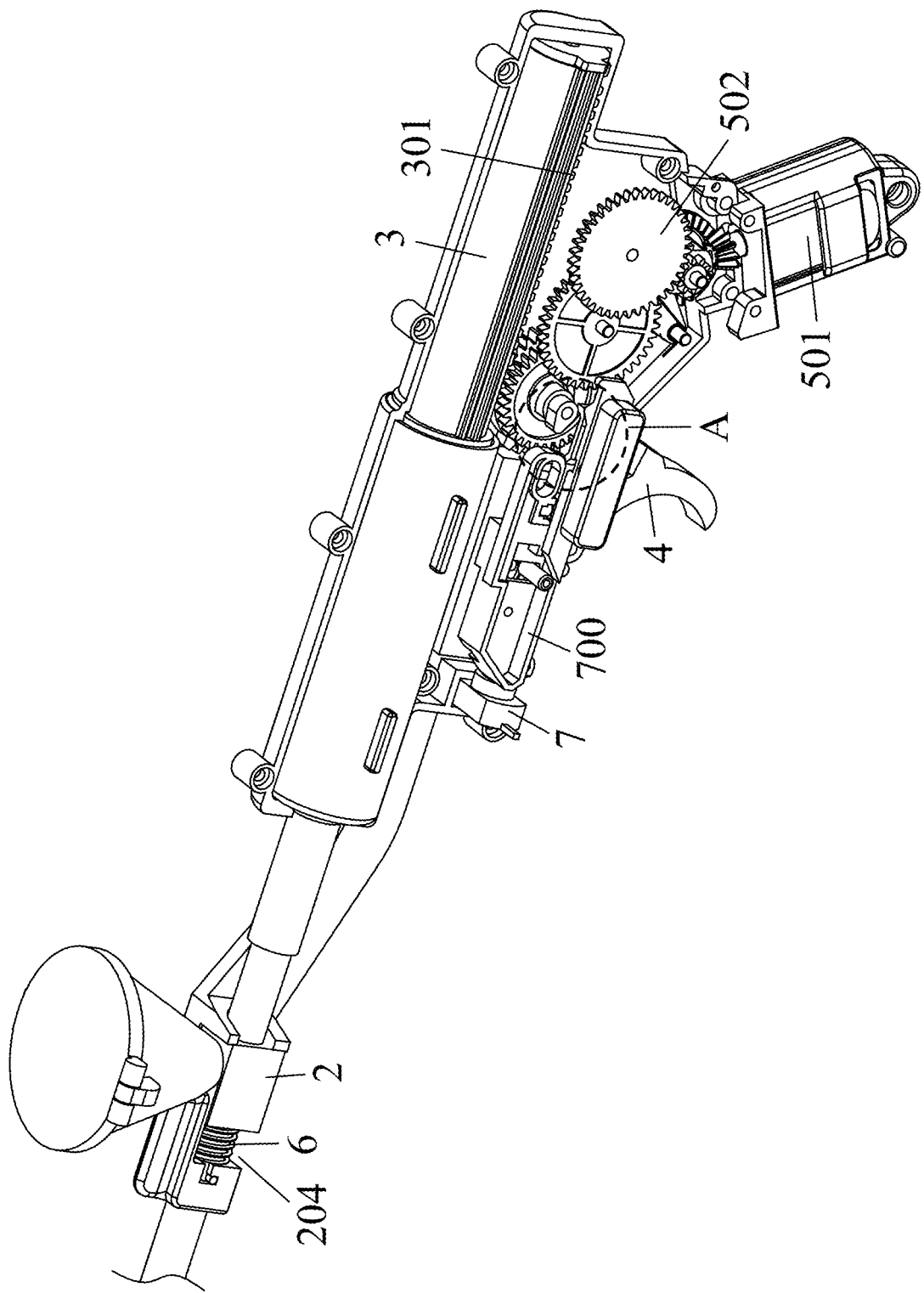
FIG. 3 is a third schematic diagram of an insecticidal gun in accordance with one embodiment of the disclosure.
Figure 4:
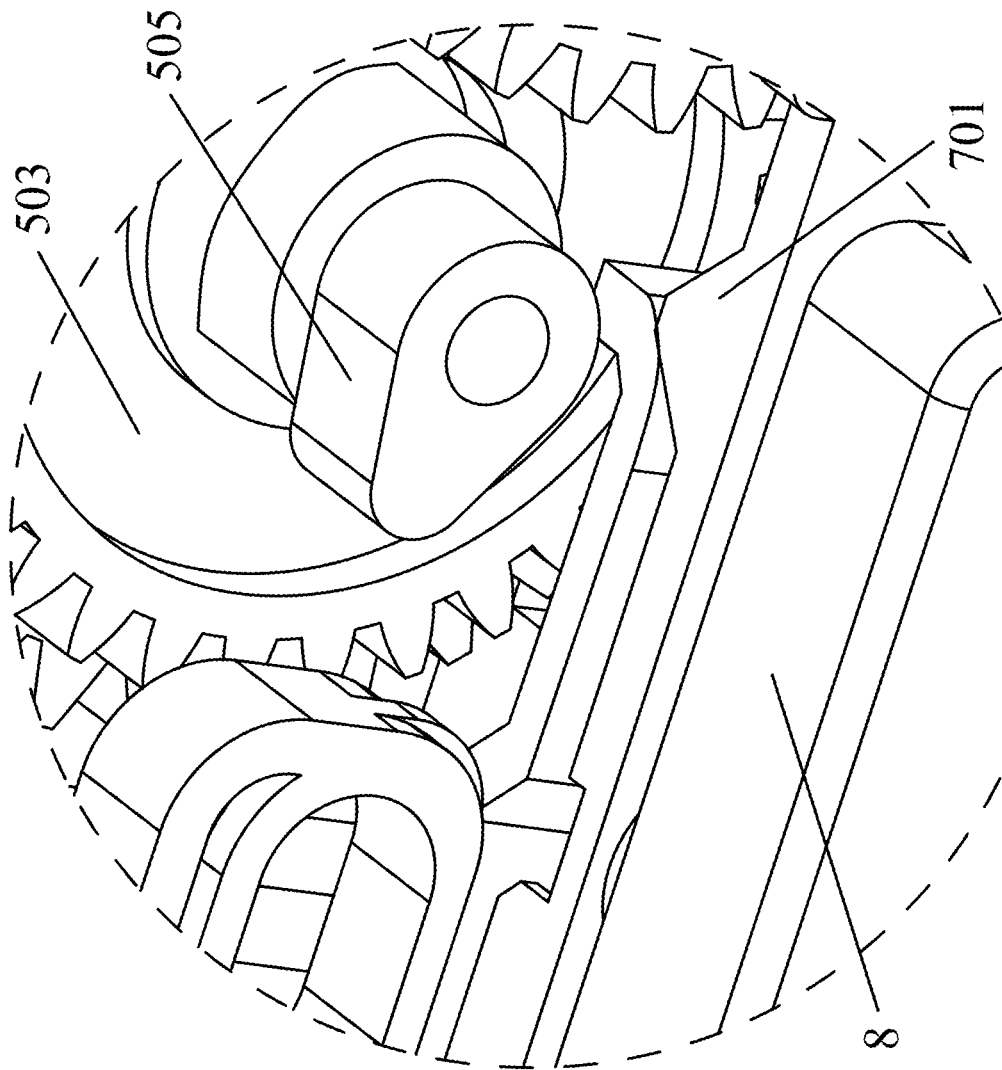
FIG. 4 is an enlarged view of part A in FIG. 3.
Figure 5:
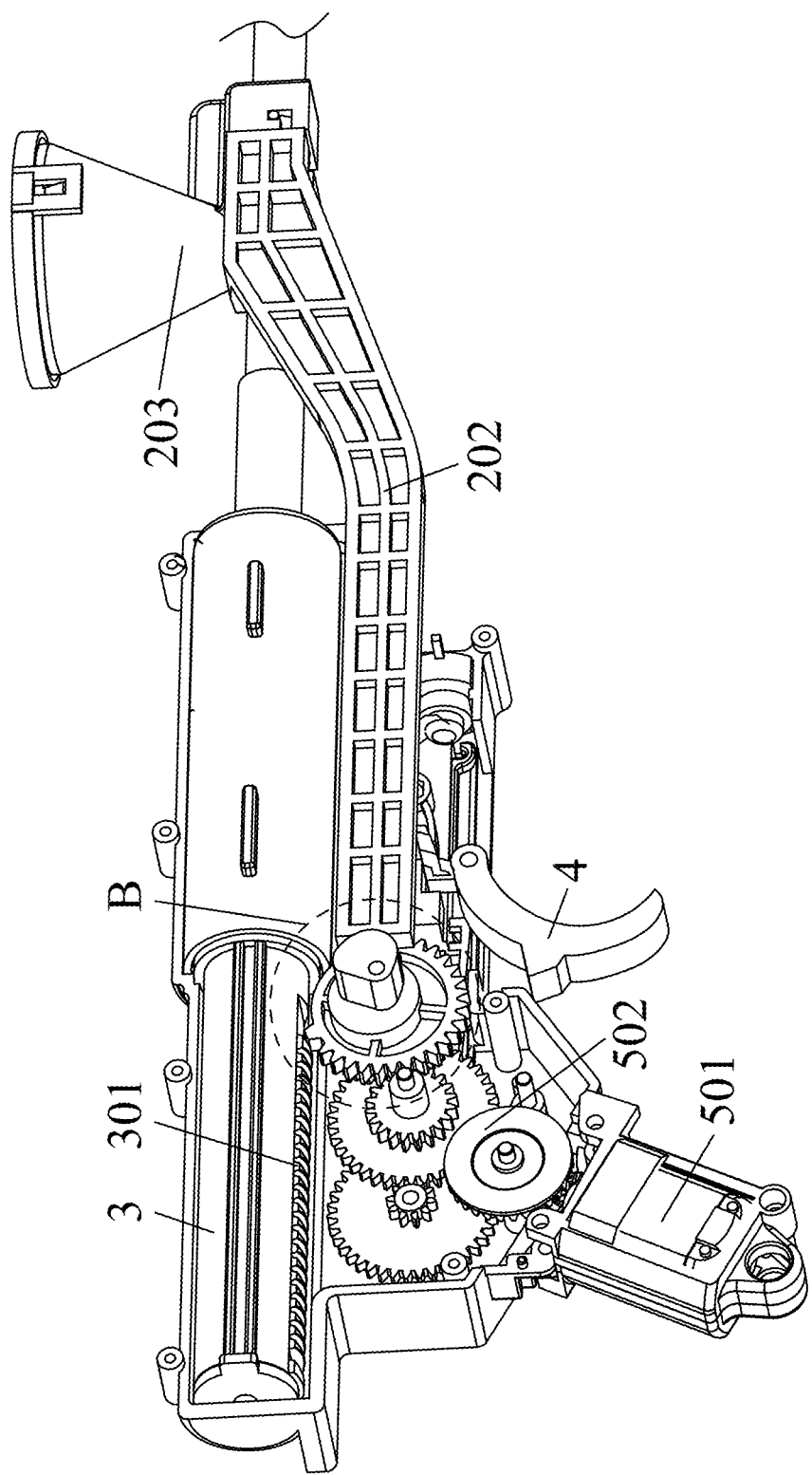
FIG. 5 is a fourth schematic diagram of an insecticidal gun in accordance with one embodiment of the disclosure.
Figure 6:
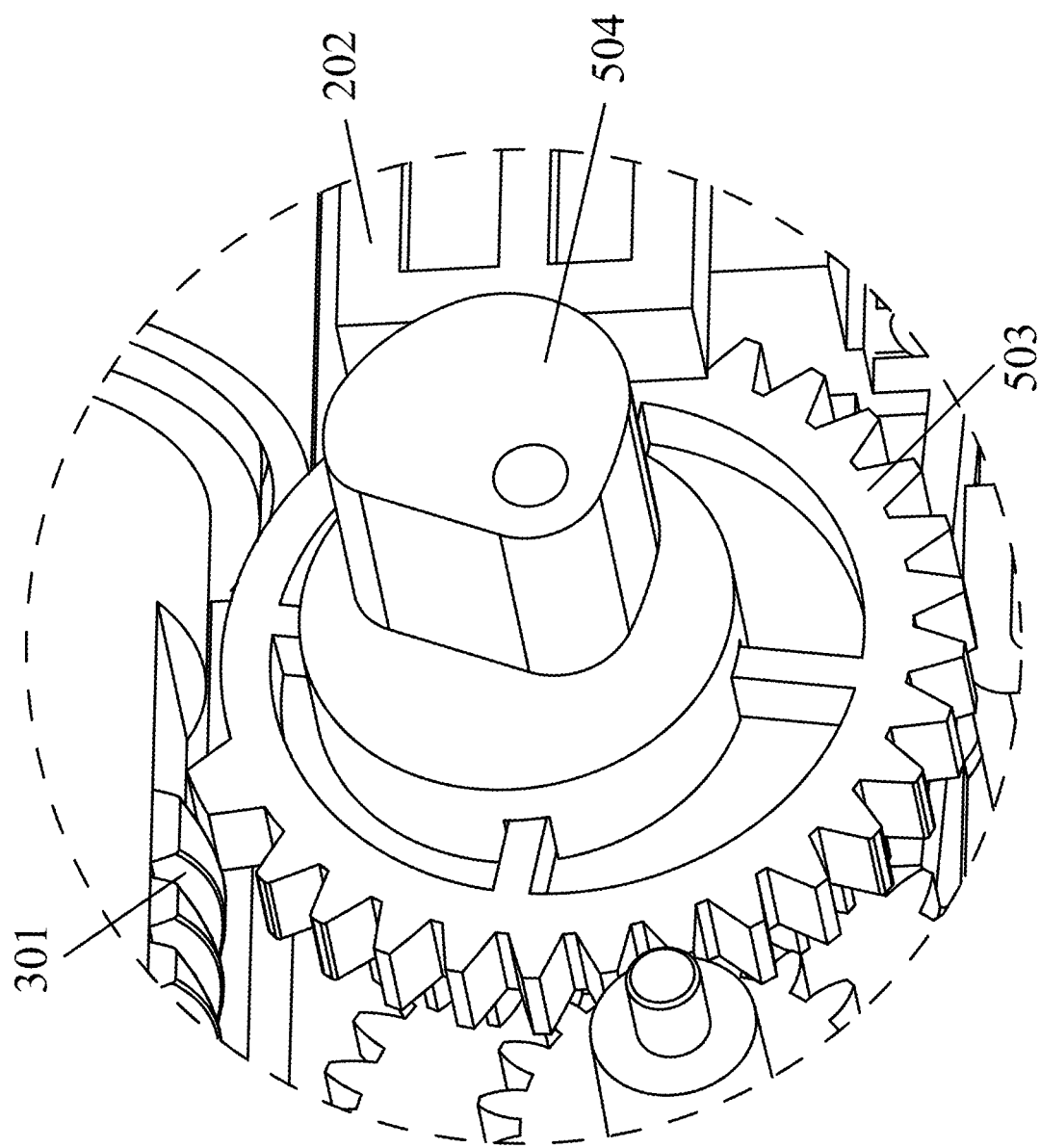
FIG. 6 is an enlarged view of part B in FIG. 5.
Figure 7:
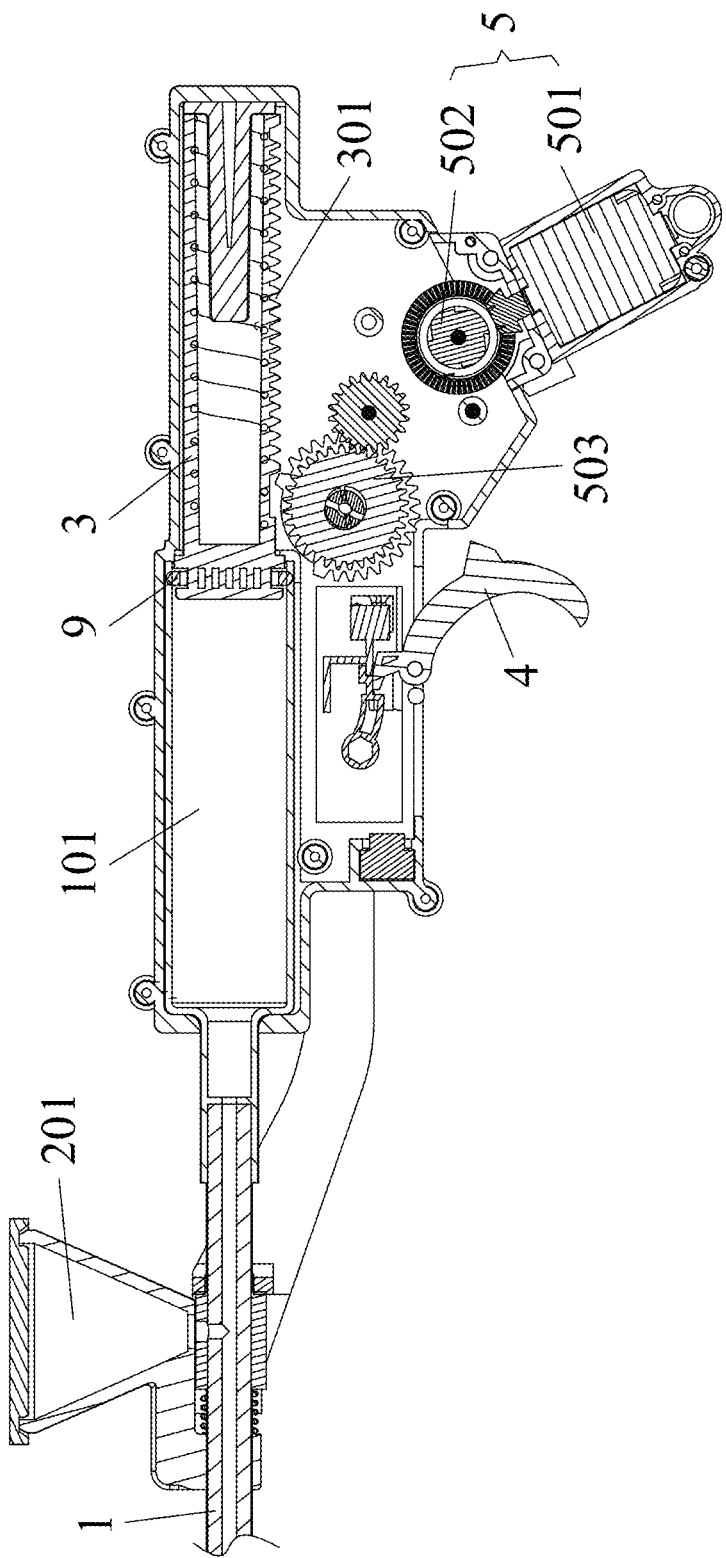
FIG. 7 is a sectional view of an insecticidal gun in accordance with one embodiment of the disclosure.

As shown in FIGS. 1-7, the disclosure provides an insecticidal gun comprising a gun body 1, a feeding member 2, a percussion member 3, a trigger 4, and an electric drive mechanism 5. The gun body 1 comprises a launching chamber 101; the feeding member 2 is slidably connected to the gun body and comprises a material storage chamber 201 configured to communicate with the launching chamber 101; the electric drive mechanism 5 is configured to drive the percussion member 3 to move in the launching chamber 101; when the percussion member 3 is driven by the electric drive mechanism 5 to move, the feeding member 2 moves along an axial direction of the gun body 1, so that the material storage chamber 201 communicates with the launching chamber 101 intermittently; and the trigger 4 is rotatable with respect to the gun body to activate or inactivate the electric drive mechanism 5.

The operation steps of using the insecticidal gun to shoot insects are as follows: firstly, the deinsectization agents (salt bullets or pesticides) are loaded into the material storage chamber 201. Then, the trigger 4 is rotated to activate the electric drive mechanism 5, which further drives the percussion member 3 to move into the launching chamber 101, so that the material storage chamber 201 intermittently communicates with the launching chamber 101. When the material storage chamber 201 is connected to the launching chamber 101, the insecticide falls into the launching chamber 101, and the insecticide in the launching chamber 101 is driven out by the percussion member 3 that moves into the launching chamber 101.

The insecticidal gun of the disclosure aims to solve the problem of inconvenient operation and low insecticidal efficiency of conventional insecticidal guns which are driven by compressed air for firing. With regard to the insecticidal gun of the disclosure, the electric drive mechanism 5 is disposed on the gun body 1 to drive the percussion member 3 to move along the launching chamber 101 to achieve the ejection of insecticides. As the percussion member 3 is driven to move by the electric drive mechanism 5, there is no need for compressed air, the operation is simple, and continuous firing can be achieved, leading to high insecticidal efficiency. Furthermore, when the electric drive mechanism 5 drives the percussion member 3 to move, the material storage chamber 201 is intermittently connected to the launching chamber 101, which can not only meet the supply of insecticides for the launching chamber 101, but also avoid the possible blockage or waste caused by the continuous supplementation of insecticides for the launching chamber 101.

In certain embodiments, the percussion member 3 comprises a rack 301 extending along the axial direction of the gun body; the electric drive mechanism 5 comprises a motor 501 disposed on the gun body 1 and a gear set 502 driven by the motor; and the gear set comprises a driving gear 503 meshed with the rack 301. Since the percussion member 3 comprises the rack 301, the electric drive mechanism 5 comprises the motor 501 and the gear set 502, and the gear set 502 has a driving gear 503, when the motor 501 drives the gear set 502 to rotate, the driving gear 503 drives the percussion member 3 to move back and forth along the launching chamber 101 through the rack 301, achieving continuous driving of the percussion member 3. The structure is simple and easy to implement.

In certain embodiments, the driving gear 503 comprises a cam 504; the feeding member 2 comprises a connecting rod 202 extending to one side of the cam 504; when in use, the electric drive mechanism 5 drives the percussion member 3 to move, the cam 504 leans against the connection rod 202 to drive the feeding member 2 on the gun body 1, and the material storage chamber 201 communicates with the launching chamber 101; the insecticidal gun further comprises an elastic member 6 disposed on one side of the feeding member 2 and sleeving the gun body 1; when the cam 504 is separated from the connection rod 202, the elastic member 6 drives the feeding member 2 to move, and the material storage chamber 201 is disconnected with the launching chamber 101. Through the technical solution, the material storage chamber 201 and the launching chamber 101 are intermittently connected during the movement of the percussion member 3 driven by the electric drive mechanism 5, with a simple structure and convenient implementation.

In certain embodiments, the feeding member 2 comprises a storage member 203 sleeving the gun body 1; the storage member 203 comprises an accommodation space 204 and the elastic member 6 is disposed in the accommodation space 204. Due to the storage member 203 having the accommodation space 204 for accommodating the elastic member 6, the installation of the elastic member 6 is stable and the driving capacity is excellent.

In certain embodiments, the cross-section of the material storage chamber 201 gradually increases in the direction away from the gun body 1, which facilitates the discharging of the insecticide in the material storage chamber 201.

In certain embodiments, the gun body 1 further a guide groove 102, and the connecting rod 202 is slidable in the guide groove 102, thus preventing the circumferential rotation of the feeding member 2 relative to the gun body 1, and ensuring that the feeding member 2 slides steadily and smoothly relative to the gun body 1.

In certain embodiments, the gun body 1 comprises a switch 7 electrically connected to the electric drive mechanism 5 on one side of the trigger 4; when rotating relative to the gun body, the trigger 4 presses or releases the switch 7 to open or close the electric drive mechanism 5. Therefore, when the trigger 4 rotates relative to the gun body 1, the electric drive mechanism 5 can be opened and closed, with a simple and convenient implementation.

In certain embodiments, the driving gear 503 comprises a stop part 505; the trigger 4 comprises a switching member 8 disposed on one side of the stop part 505; the switching member 8 is movable along the axial direction of the gun body 1 to change between a single firing position and a continuous firing position; the trigger 4 further comprises a firing seat 700 configured to pushing against the switch 7 to start the electric drive mechanism 5 or detach from the switch 7 to close the electric drive mechanism 5; when the switching member 8 is in a single firing position, the stop part 505 abuts against the switching member 8 and the firing seat 700 detaches from the switch 7 to close the electric drive mechanism 5; the switching member 8 comprises an active part 701 abutting against the stop part 505; when moving to a continuous firing position, the switching member 8 pushes the active part 701 to move and release the stop part 505. The switching member 8 disposed on one side of the trigger 4 is capable of moving between a single firing position and a continuous firing position; and the firing mode is selected by controlling the relative position of the switching member 8 and the stop part 505. Specifically, when the switching member 8 moves to the single firing position, the stop part 505 can press against the switching member 8, causing the firing seat 700 to detach from the switch 7 and close the electric drive mechanism 5, achieving single firing. When the switching member 8 moves to the continuous firing position, the firing seat 700 is driven to move and release the stop part 505, keeping the electric drive mechanism 5 in an open state to achieve continuous firing.

In certain embodiments, the percussion member 3 comprises one end extending into the launching chamber 101, and a seal ring 9 is disposed on the outer wall of the end. The design ensures the sealing between the percussion member 3 and the launching chamber 101 during assembly, thus avoiding the leakage of the air.

It will be obvious to those skilled in the art that changes and modifications may be made, and therefore, the aim in the appended claims is to cover all such changes and modifications.

What is claimed is:

1. An insecticidal gun, comprising:
   a gun body;
   a feeding member;
   a percussion member;
   a trigger; and
   an electric drive mechanism;
   wherein:
   the gun body comprises a launching chamber; the feeding member is slidably connected to the gun body and comprises a material storage chamber configured to communicate with the launching chamber;
   the electric drive mechanism is configured to drive the percussion member to move in the launching chamber;
   when the percussion member is driven by the electric drive mechanism to move, the feeding member moves along an axial direction of the gun body, so that the material storage chamber communicates with the launching chamber intermittently; and
   the trigger is rotatable with respect to the gun body to activate or inactivate the electric drive mechanism.

2. The gun of claim 1, wherein the percussion member comprises a rack extending along the axial direction of the gun body; the electric drive mechanism comprises a motor disposed on the gun body and a gear set driven by the motor; and the gear set comprises a driving gear meshed with the rack.

3. The gun of claim 2, wherein the driving gear comprises a cam; the feeding member comprises a connecting rod extending to one side of the cam; when in use, the electric drive mechanism drives the percussion member to move, the cam leans against the connection rod to drive the feeding member on the gun body, and the material storage chamber communicates with the launching chamber; and the insecticidal gun further comprises an elastic member disposed on one side of the feeding member and sleeving the gun body; when the cam is separated from the connection rod, the elastic member drives the feeding member to move, and the material storage chamber is disconnected with the launching chamber.

4. The gun of claim 3, wherein the feeding member comprises a storage member sleeving the gun body; the storage member comprises an accommodation space and the elastic member is disposed in the accommodation space.

5. The gun of claim 4, wherein a cross-section of the material storage chamber gradually increases in a direction away from the gun body.

6. The gun of claim 3, wherein the gun body further a guide groove, and the connecting rod is slidable in the guide groove.

7. The gun of claim 2, wherein the driving gear comprises a stop part; the trigger comprises a switching member disposed on one side of the stop part; the switching member is movable along the axial direction of the gun body to change between a single firing position and a continuous firing position; the trigger further comprises a firing seat configured to pushing against or detach from the switch; when the switching member is in a single firing position, the stop part abuts against the switching member and the firing seat detaches from the switch; the switching member comprises an active part abutting against the stop part; when moving to a continuous firing position, the switching member pushes the active part to move and release the stop part.

8. The gun of claim 1, wherein the gun body comprises a switch electrically connected to the electric drive mechanism on one side of the trigger; when rotating relative to the gun body, the trigger presses or releases the switch to open or close the electric drive mechanism.

9. The gun of claim 1, wherein the percussion member comprises one end extending into the launching chamber, and a seal ring is disposed on an outer wall of the end.

* * * * *